US008311457B2

(12) United States Patent
Takigawa et al.

(10) Patent No.: US 8,311,457 B2

(45) Date of Patent: Nov. 13, 2012

(54) CONSTANT VELOCITY JOINT AND IMAGE FORMING APPARATUS

(75) Inventors: Junya Takigawa, Tokyo (JP); Yoshimi Asayama, Mie (JP)

(73) Assignees: Ricoh Company, Limited, Tokyo (JP); NTN Corporation, Osaka (JP)

(*) Notice: Subject to any disclaimer, the term of this patent is extended or adjusted under 35 U.S.C. 154(b) by 0 days.

(21) Appl. No.: 12/926,046

(22) Filed: Oct. 22, 2010

(65) Prior Publication Data

US 2011/0091244 A1 Apr. 21, 2011

Related U.S. Application Data

(62) Division of application No. 11/657,667, filed on Jan. 25, 2007, now Pat. No. 7,844,202.

(30) Foreign Application Priority Data

Feb. 21, 2006 (JP) ................................ 2006-044578
Feb. 24, 2006 (JP) ................................ 2006-048853

(51) Int. Cl.
*G03G 15/00* (2006.01)
*F16D 3/00* (2006.01)

(52) U.S. Cl. ........ 399/167; 399/117; 399/159; 464/139; 464/145; 464/146

(58) Field of Classification Search .................... 399/88, 399/116, 117, 159, 167; 464/139, 145, 146
See application file for complete search history.

(56) References Cited

U.S. PATENT DOCUMENTS

| | | | |
|---|---|---|---|
| 4,457,395 A | 7/1984 | Ernst et al. | |
| 5,848,329 A | 12/1998 | Aoyama et al. | |
| 5,855,519 A * | 1/1999 | Kadota | 464/145 |
| 2005/0281586 A1 | 12/2005 | Ohashi et al. | |
| 2006/0061829 A1 | 3/2006 | Yamazaki et al. | |
| 2006/0067737 A1 | 3/2006 | Yamazaki et al. | |

FOREIGN PATENT DOCUMENTS

| | | |
|---|---|---|
| JP | 52-034699 | 9/1977 |
| JP | 61-116156 | 6/1986 |
| JP | 6-159381 | 6/1994 |
| JP | 07-224845 | 8/1995 |
| JP | 11-093965 | 4/1999 |
| JP | 11-153146 | 6/1999 |

(Continued)

OTHER PUBLICATIONS

Japanese Office Action dated Apr. 9, 2010 for corresponding Japanese Application No. 2006-048853.

(Continued)

*Primary Examiner* — Joseph S Wong

(74) *Attorney, Agent, or Firm* — Harness, Dickey & Pierce, P.L.C.

(57) ABSTRACT

A constant velocity joint includes a first rotation body and a second rotation body. The first rotation body includes a cup unit, a shaft, and ribs that project from the cup unit and connect the cup unit to the shaft. One of the first rotation body and the second rotation body transmits a rotational driving force to other one of the first rotation body and the second rotation body through balls. The first rotation body is so formed that the cup unit and the shaft are formed into one piece using resin material. Moreover, the rib is so formed into one piece with the cup unit and the shaft using resin material.

12 Claims, 9 Drawing Sheets

FOREIGN PATENT DOCUMENTS

| | | |
|---|---|---|
| JP | 11-336779 | 12/1999 |
| JP | 2000-221863 | 8/2000 |
| JP | 2003-345221 | 12/2003 |
| JP | 2004-251426 | 9/2004 |
| JP | 2004-338140 | 12/2004 |

OTHER PUBLICATIONS

Japanese Office Action dated Apr. 9, 2010 for corresponding Japanese Application No. 2006-044578.

* cited by examiner

CONSTANT VELOCITY JOINT AND IMAGE FORMING APPARATUS

CROSS-REFERENCE TO RELATED APPLICATIONS

This U.S. nonprovisional application is a divisional of and claims priority under 35 U.S.C. §121 to U.S. application Ser. No. 11/657,667 filed Jan. 25, 2007 now U.S. Pat. No. 7,844,202, which claims priority under 35 U.S.C. §119 to Japanese Patent Application No. 2006-048853, filed on Feb. 24, 2006, and Japanese Patent Application No. 2006-044578, filed on Feb. 21, 2006, filed in the Japanese Intellectual Property Office, the entire contents of each of which are hereby incorporated herein by reference.

BACKGROUND OF THE INVENTION

1. Field of the Invention

The present invention relates to a constant velocity joint, and an image forming apparatus that uses the constant velocity joint.

2. Description of the Related Art

Constant velocity joints are used to transmit a rotational torque of a drive shaft of a vehicle to the vehicle shaft. The constant velocity joint transmits the driving force between a driving shaft and a driven shaft that are aligned in an axis direction in a rotational direction at a constant velocity while permitting skew between the two shafts. The constant velocity joint is a drive transmission mechanism that is widely used not only for vehicles but also for various industrial machines.

A typical constant velocity joint includes a first rotation body and a second rotation body that are aligned in the axis direction as disclosed in Japanese Patent Publication No. S52-34699. The first rotation body includes a cup-shape cup unit in which one end in the axis direction in an annular space created between an outer ring and an inner ring inside the outer ring is opened while the other end thereof is closed. In this cup unit, an interior surface of the outer ring and an exterior surface of the inner ring that are opposed to each other through the annular space are provided with a plurality of grooves formed thereon, respectively, the grooves extending in the axis direction and being aligned in a circumferential direction. On the other hand, the second rotation body includes a cylindrical ball holder that is to be inserted into the annular space of the first rotation body. A cylindrical peripheral wall of the ball holder is provided with a plurality of through holes formed thereon so as to be aligned in a circumferential direction, with each of the through holes holding a ball. The second rotation body is inserted into the annular space of the first rotation body in such a manner that these balls are correspondingly engaged with the grooves formed on the interior surface of the outer ring and the exterior surface of the inner ring of the first rotation body. When either one of the first rotation body or the second rotation body rotates as a driving body, the rotational force is transmitted to the other one of the first rotation body or the second rotation body through the plurality of balls that are engaged in the grooves.

Conventionally, the first rotation body and the second rotation body are made of metals so that the constant velocity joint was heavy. Furthermore, the constant velocity joint made loud operation noise due to a friction between the balls and the outer ring or the inner ring. The annular space of the first rotation body is filled with grease for the purpose of a smooth rolling of the balls; however, there is a concern that a leakage of this grease may bring contamination to a surrounding environment. As such, the conventional constant velocity joint was hardly applicable to office machines, acoustic instruments, medical equipments, domestic electric appliances, machines used to manufacture food, or the like.

Thus, there was a need for a constant velocity joint that can be light, less noisy, and that can be in office machines, acoustic instruments, medical equipments, domestic electric appliances, machines used to manufacture food, or the like.

SUMMARY OF THE INVENTION

It is an object of the present invention to at least partially solve the problems in the conventional technology.

According to an aspect of the present invention, a constant velocity joint includes a first rotation body including a cup-shaped cup unit formed by opening one end in an axis direction of an annular space created between an outer ring and an inner ring inside the outer ring while closing other end thereof; a plurality of grooves provided on at least one of an inner surface of the outer ring and an outer surface of the inner ring so as to be aligned in a circumferential direction while extending in the axis direction; and a shaft that projects from the other end of the cup unit and extends on a central axis line of the cup unit; and a second rotation body including a ball holder that holds a ball in each of a plurality of through holes, the through holes being provided on a cylindrical peripheral wall so as to be aligned in a peripheral direction thereof. One of the first rotation body and the second rotation body transmits a rotational driving force to other one of the first rotation body and the second rotation body through the balls while the ball holder is inserted into the annular space and the balls held by the ball holder are engaged in the grooves within the annular space, and the first rotation body is so formed that the cup unit and the shaft are formed into one piece using resin material, and at least one rib, that projects from other end of the cup unit and connects the cup unit with the shaft, is so formed that the rib is formed into one piece with the cup unit and the shaft using resin material.

According to another aspect of the present invention, an image forming apparatus includes a latent image carrier that caries a latent image on a surface that is movable endlessly; a latent image forming unit that forms the latent image on the surface; a developing member that develops the latent image on the latent image carrier by using a developing agent into a visible image; a transfer unit that transfers the visible image to any one of another surface of the surface endless mover and a recording member held by the surface endless mover; a drive transmission mechanism that transmits a driving force from a driving source to at least one of the latent carrier, the developing member, and the surface endless mover; and a constant velocity joint provided within the drive transmission mechanism. The constant velocity joint includes a first rotation body including a cup-shaped cup unit formed by opening one end in an axis direction of an annular space created between an outer ring and an inner ring inside the outer ring while closing other end thereof; a plurality of grooves provided on at least one of an inner surface of the outer ring and an outer surface of the inner ring so as to be aligned in a circumferential direction while extending in the axis direction; and a shaft that projects from the other end of the cup unit and extends on a central axis line of the cup unit; and a second rotation body including a ball holder that holds a ball in each of a plurality of through holes, the through holes being provided on a cylindrical peripheral wall so as to be aligned in a peripheral direction thereof. One of the first rotation body and the second rotation body transmits a rotational driving force to other one of the first rotation body and the second rotation body through the balls while the ball holder is inserted into the annular space and the balls held by the ball holder are engaged in the grooves within the annular space, and the first rotation body is so formed that the cup unit and the shaft are formed into one piece using resin material, and at least one rib, that projects from the other end of the cup unit and connects the cup unit with the shaft, is so formed that the rib is formed into one piece with the cup unit and the shaft using resin material.

According to still another aspect of the present invention, a constant velocity joint includes a first rotation body including a cup-shaped cup unit formed by opening one end in an axis direction of an annular space created between an outer ring and an inner ring inside the outer ring while closing other end thereof; a plurality of grooves provided on at least one of an inner surface of the outer ring and an outer surface of the inner ring so as to be aligned in a circumferential direction while extending in the axis direction; and a second rotation body including a ball holder that holds a ball in each of a plurality of through holes, the through holes being provided on a cylindrical peripheral wall so as to be aligned in a peripheral direction thereof. A rotational driving force of one of the first rotation body and the second rotation body is transmitted to the other one of the first rotation body and the second rotation body through the plurality of balls while the ball holder is inserted into the annular space and the balls held by the ball holder are engaged in the grooves within the annular space. The outer ring has a multi-layered structure including an innermost layer that is formed of resin material and that defines the inner surface and a metal layer that is formed of metal material and that is positioned outside the innermost layer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below. The following embodiments consider a multi-color laser printer (hereinafter, "printer") of an electrophotography type as an example of an image forming apparatus.

In a constant velocity joint according to a first embodiment of the present invention, a cup unit of a first rotation body is formed of a resin material. Moreover, ribs, that project from the cup unit, connect the cup unit with a shaft in such a manner. The ribs are formed integrally with the cup unit and the shaft, resulting in serving as a beam of the cup unit.

Figure 1:
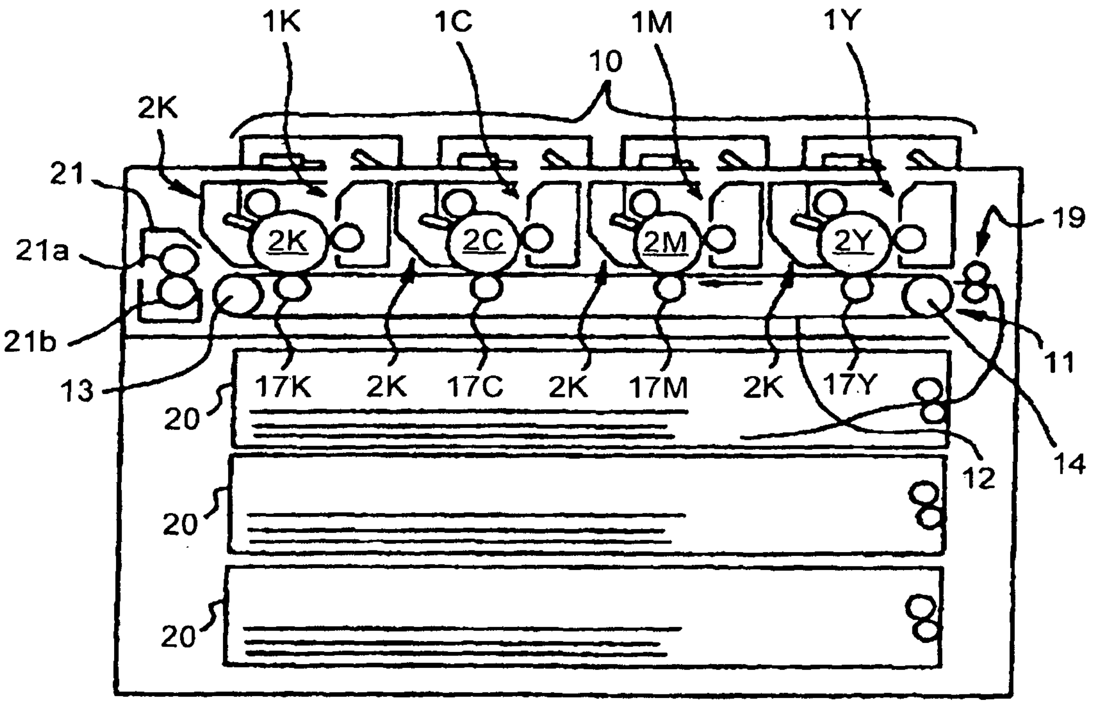
FIG. 1 is a schematic view for explaining a printer according to a first embodiment of the present invention.

FIG. 1 is a schematic view of a laser printer in which the constant velocity joint according to the first embodiment is employed. The laser printer includes four sets of processing units 1Y, 1M, 1C, 1K that form images of color such as yellow (Y), magenta (M), cyan (C), and black (B), respectively. Letters Y, M, C, and K following the reference numerals represent units corresponding to yellow, magenta, cyan, and black, respectively. The laser printer also includes an optical writing unit 10, a transfer unit 11, a pair of resist rollers 19, three paper feeding cassettes 20, and a fusing unit 21.

The optical writing unit 10 includes four optical writing devices. Each of the optical writing devices includes a light source, a polygon mirror, an f-theta lens, and a reflection mirror.

Figure 2:
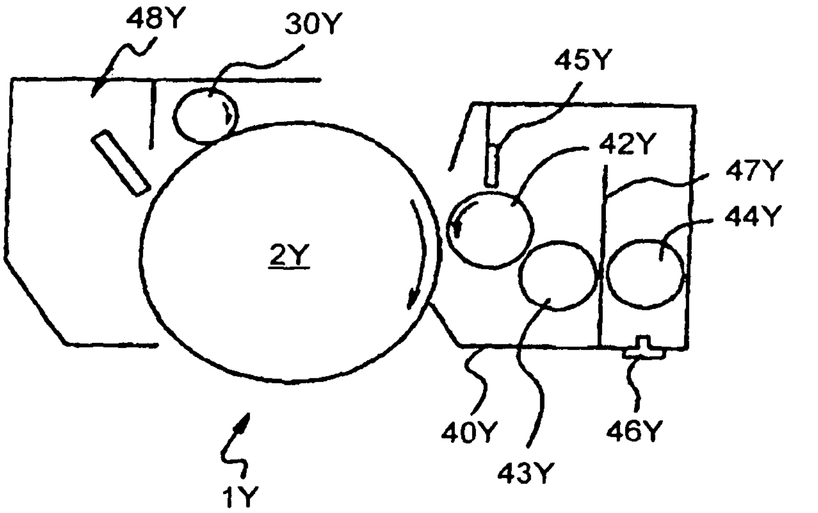
FIG. 2 is an enlarged view for explaining a processing unit for Y of the printer according to the first embodiment.

FIG. 2 is an enlarged view of the processing unit 1Y for yellow. The other processing units 1M, 1C, and 1K have almost the same structure as that of the processing unit 1Y; therefore, explanation for those processing units is omitted. The processing unit 1Y includes a drum-shaped photo conductor 2Y, a charging unit 30Y, a developing unit 40Y, and a dram cleaning device 48Y.

The charging unit 30Y includes a charging roller to which electro static charge bias is applied. The charging roller is in physical contact with, or placed near the photo conductor 2Y. As a result, an electric discharge is produced between the electro static discharge roller and the photo conductor 2Y, due to which the entire surface of the photo conductor is electrically charged. The charged surface of the photo conductor 2Y is irradiated and scanned with the laser light having been modulated and biased by the optical writing unit 10. Accordingly, an electrostatic latent image is formed on the surface of the photo conductor 2Y. The electrostatic latent image is developed by the developing unit 40Y to a Y toner image.

The developing unit 40Y includes a casing and a developing sleeve 42Y arranged in the casing. The developing sleeve 42Y serves as a developing member and it is arranged in such a manner that a portion of it is exposed from an opening in the casing. The developing unit 40Y further includes a first conveying screw 43Y, a second conveying screw 44Y, a developing doctor 45Y, and a toner-concentration detecting sensor (hereinafter, "T sensor") 46Y.

The casing contains a binary developer containing a magnetized carrier and a negatively charged Y toner. The binary developer is electrically charged due to friction while it is agitated and conveyed by the first conveying screw 43Y and the second conveying screw 44Y. The electrically charged binary developer sticks to the surface of the developing sleeve 42Y in the form of a layer. The thickness of the layer of the binary developer is controlled by the developing doctor 45Y, and the layer of the binary developer is conveyed to a developing region opposing to the photo conductor 2Y. The Y toner separates from the developing sleeve 42Y and adheres onto the electrostatic latent image on the photo conductor 2Y. As a result, a Y toner image is formed on the photo conductor 2Y. The binary developer on the developing sleeve 42Y, which now contains no Y toner, is returned into the casing due to a rotation of the developing sleeve 42Y.

A partition 47Y is provided between the first conveying screw 43Y and the second conveying screw 44Y. This partition 47Y serves to separate the casing into a first supplying unit keeping therein the developing sleeve 42Y, the first conveying screw 43Y, and so on and a second supplying unit keeping therein the second conveying screw 44Y. The first conveying screw 43Y is rotationally driven by a driving means (not shown) to convey the binary developer within the first supplying unit from a near side to a back side in a direction orthogonal to a paper surface of FIG. 2, thereby supplying the binary developer to the developing sleeve 42Y. The binary developer conveyed near to an end portion of the first supplying unit by the first conveying screw 43Y comes into the second supplying unit through the opening that is provided in the partition 47Y (not shown). In the second supplying unit, the second conveying screw 44Y is driven rotationally by the driving means (not shown) to convey the binary developer sent from the first conveying unit to the other direction of the first conveying screw 43Y. The binary developer conveyed near to the end portion of the second supplying unit by the second conveying screw 44Y returns into the first supplying unit through the other opening (not shown) provided in the partition 47Y.

The T sensor including a magnetic permeability sensor is provided on a bottom wall around a center of the second supplying unit to output an electric pressure of a value corresponding to a magnetic permeability of the binary developer that passes over the T sensor. Since there is a correlation on some level between the magnetic permeability of the binary developer and the toner concentration, the T sensor 46Y outputs the electric pressure corresponding to the Y toner concentration. The value of the output electric pressure is sent to a controlling unit (not shown). This controlling unit includes a RAM that stores data of Vtref for Y that is a targeted value of the output electric pressure from the T sensor 46Y. The RAM also stores data of Vtref for M, Vtref for C, and Vtref for K that are the targeted values of the output electric pressure from the T sensor that is mounted on the other developing unit (not shown). The Vtref for Y is utilized for controlling a drive of a Y toner conveying device (not shown). More specifically, the controlling unit, to have the value of the output electrical pressure from the T sensor 46Y be approximate to the Vtref for Y, drive controls a Y toner conveying device (not shown) to supply the Y toner to the second supplying unit 49Y. As such, a Y toner concentration of the binary developer in the developing unit 40Y is kept within a predetermined range. With regard to the developing devices of the other processing units, the same controlling process in supplying toner is performed.

The Y toner image formed on the photo conductor 2Y for Y is transferred onto a recording paper to be conveyed to a paper conveying belt. The surface of the photo conductor 2Y after receiving the Y toner image is subjected to a cleaning of remaining toner by a drum cleaning device 48Y and then a static electricity is eliminated by a static eliminator (not shown). Subsequently, the entire surface of the photo conductor is uniformly charged with the static electricity by the charging unit 30Y for the sake of next image formation. The same process is performed by the other processing units. Each of the processing units is detachable from a printer body and is replaced when the lifetime of the unit expires.

In FIG. 1 as explained above, the transfer unit 11 as a transfer means includes an endless paper conveying belt 12, a driving roller 13, tension rollers 14, 15, four transfer bias rollers 17Y, 17M, 17C, 17K, and so on. The paper conveying belt 12 as an endless surface mover, while it is stretched by the driving roller 13 and the tension rollers 14, 15, is moved endlessly in a counterclockwise direction in FIG. 1 by means of the driving roller 13 that is rotated by a driving system (not shown).

Each of the four transfer bias rollers 17Y, 17M, 17C, 17K are applied with a transfer bias from a power source (not shown). Then, the transfer bias rollers pressurize the paper conveying belt 12 from its back surface onto the photo conductor 2Y, 2M, 2C, 2K to form a respective transfer nip. Each transfer nip is provided with a transfer electric field between the photo conductor and the transfer bias roller by an influence of the transfer bias. The Y toner image formed on the photo conductor 2Y for Y is transferred onto a recording paper P to be conveyed to the paper conveying belt 12 owing to an influence of this transfer electric field and a nip pressure. Each of an M toner image, a C toner image, and a K toner image formed on the corresponding photo conductors 2M, 2C, 2K is sequentially transferred onto this Y toner image. Such superimposing transfer enables to form a multi colored toner image in association with white color of the paper on the recording paper P, that serves as a recording material and is conveyed to the paper conveying belt 12.

Three paper feeding cassettes 20 are arranged in a multi-staged manner below the transfer unit 11, each of the cassettes storing a plurality of recording papers P in a stacking manner. In each of the cassettes, a paper feeding roller pair is closely brought into contact with the uppermost recording paper P. When the paper feeding roller is driven rotationally at a predetermined timing, the uppermost recording paper P is fed to a paper conveying path.

The recording paper P fed to the paper conveying path from the paper feeding cassette 20 is nipped between rollers of a pair of resist rollers 19. The paired resist rollers 19 feed the recording paper P nipped therebetween at a timing a toner image can be superimposed at each of the transfer nip. Accordingly, the toner image can be superimposed and thereby transferred onto the recording paper P at each transfer nip. The recording paper P on which a multicolor image is formed is sent to a fusing unit 21.

The fusing unit 21 forms a fusing nip by a combination of a heating roller 21*a* having a heat source therein such as a halogen lamp and a pressuring roller 21*b* that is brought into contact with the heating roller by being pressurized. Subsequently, while the heating roller and the pressuring roller nip the recording paper P at this fusing nip, the multicolor image is fused on the surface of the recording paper P. The recording paper P that passed through the fusing unit 21 is ejected to the outside of the apparatus through a pair of ejecting rollers (not shown).

Figure 3A:
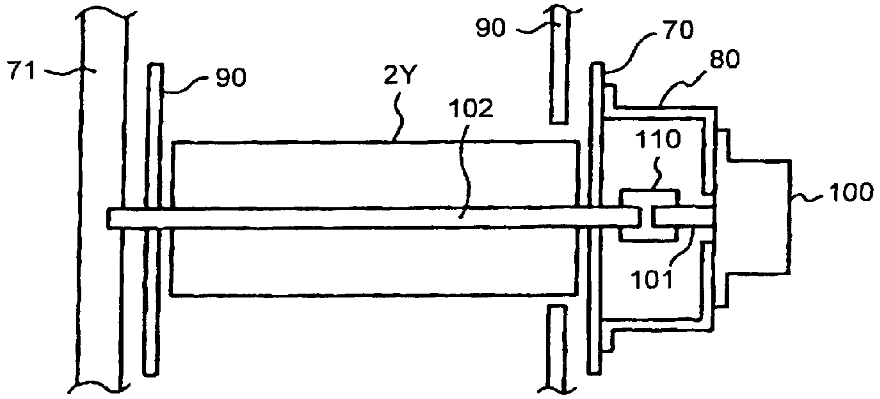
FIG. 3A is a longitudinal cross section of the processing unit for Y and its surrounding structure.
Figure 3B:
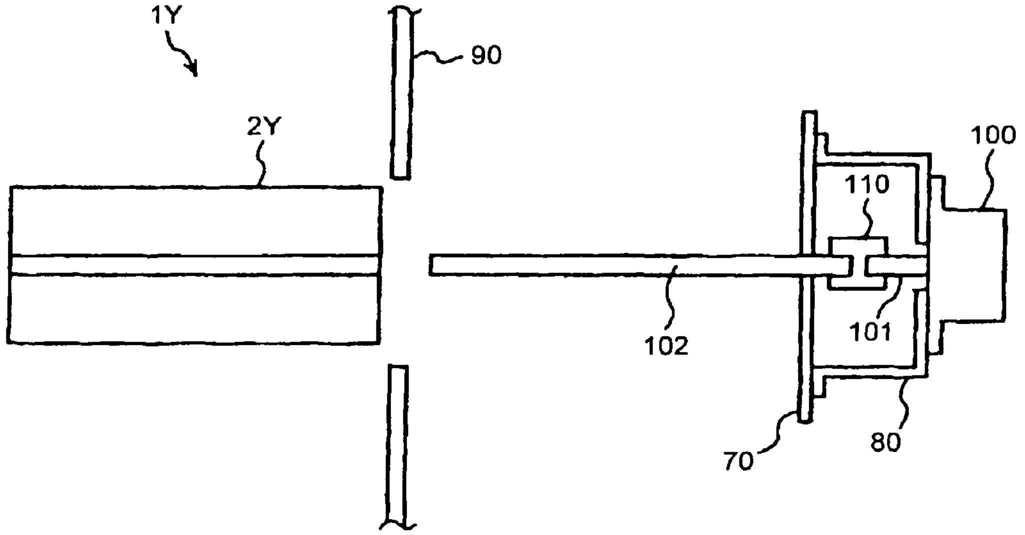
FIG. 3B is a longitudinal cross section of the processing unit for Y in the course of being detached from the printer and its surrounding structure.

FIG. 3A is a longitudinal cross sectional view for explaining the processing unit for Y that is installed in the printer and its surrounding structure, FIG. 3B is a longitudinal cross sectional view for explaining the processing unit for Y in the course of being detached from the printer and its surrounding structure. When viewing these drawings in a left and right direction, a left side is to a front side of the printer and a right side is to a back side of the printer. As illustrated in FIG. 3A, the processing unit 1Y installed in the printer is positioned between a front board 71 arranged near a front end of the printer body and a back board 70 of the printer body. As illustrated in FIG. 3B, a center of a circle of the photo conductor 2Y having a cylindrical shape is provided with a central hole that pierces through from one end to the other end in an axis direction of the photo conductor. The back board 70 holds a photo conductor shaft 102 as a rotational driven shaft in a rotation free manner through a shaft bearing (not shown). Further, as illustrated in FIG. 3A, when the processing unit 1Y is installed in the printer, the photo conductor shaft 102 held by the back board 70 is inserted into the central hole of the photo conductor 2Y. A lateral cross section of this central hole has a non-circular shape such as a D-letter shape, an oval shape and thus a lateral cross section of the photo conductor shaft 102 also has the shape in accordance with the shape of the central hole. Accordingly, the photo conductor shaft 102 having inserted into the central hole would not run idle within the hole and thus a rotational driving force of the photo conductor shaft 102 can be transmitted to the photo conductor 2Y.

Since the photo conductor shaft 102 pierces through the back board 70 of the printer body, a rear end of the photo conductor shaft resides further back of the back board 70. The back board 70 of the printer body is provided with a driving motor 100 that serves as a driving source in a securing manner through a bracket 80. The driving motor 100 is arranged on the side of the back board 70 that is on the other side of the back board 70. Further, the photo conductor shaft 102 and a driving shaft 101 as a rotational driving shaft of the driving motor 100 are arranged in an axis direction and are connected through a constant velocity joint 110.

The driving motor 100 is a so-called direct motor that transmits a rotational driving force to the photo conductor 2Y without using a gear or the like. With such a structure that the driving force is directly transmitted between the driving shaft 101 and the photo conductor shaft 102 without using the gear, a velocity fluctuation of the photo conductor caused by an eccentric gear and an uneven pitch is avoidable.

When the processing unit 1Y is detached from the printer, the movable front board 71 is moved back from the opposing position with regard to the back board 70. Then, the processing unit 1Y is pulled out from the back side to the front side of the printer. In the meantime, the photo conductor 2Y is held by a frame 90 of the processing unit 1Y (as shown in FIG. 3B).

Next, a featured structure of the printer according to the first embodiment will be explained.

Figure 4:
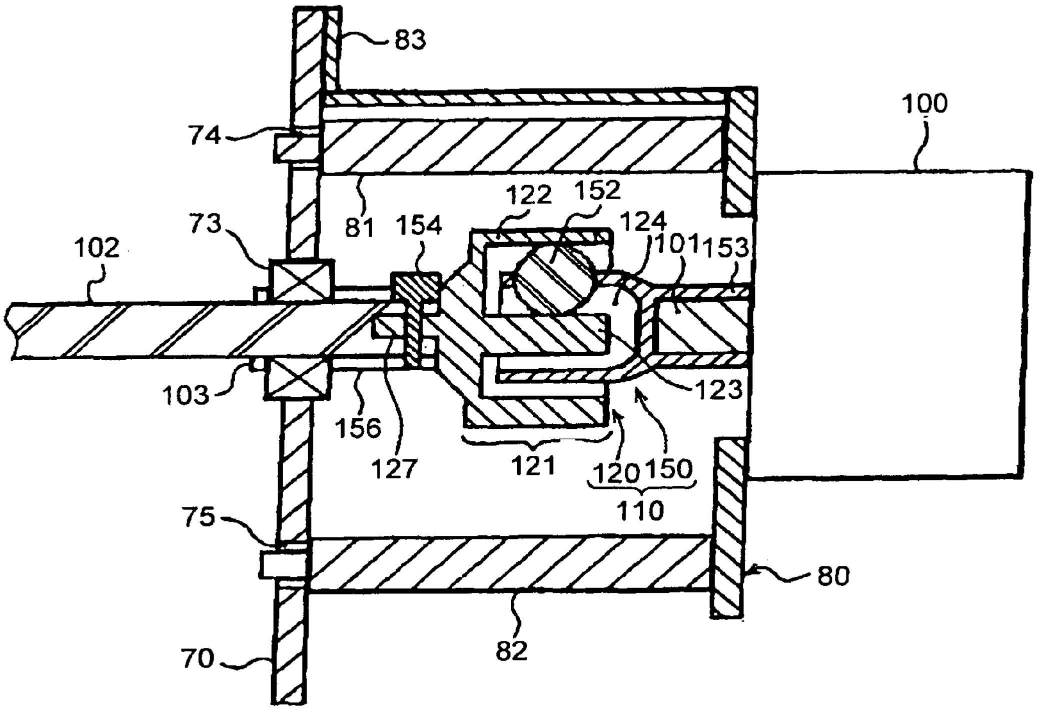
FIG. 4 is a cross section of a constant velocity joint of the printer and its surrounding structure.

FIG. 4 is a cross sectional view for explaining the constant velocity joint 110 and its surrounding structure. In FIG. 4, a left side of the back board 70 in FIG. 4 is a unit side in which a processing unit (not shown) is housed, and a right side of the back board 70 in FIG. 4 is a drive transmission side in which the driving motor 100 and so on are housed. A surface of the back board 70 of the drive transmission side is provided with the bracket 80 in a secured manner, and further a back surface of the bracket 80 is provided with the driving motor 100 in a secured manner. Still further, the bracket 80 houses therein the constant velocity joint 110.

The bracket 80 is so formed that a plate is subjected to a bending process such as a press work process. The bracket 80 includes two positioning pins 81, 82 that are respectively inserted into two positioning holes 74, 75 in the back board 70 to position the bracket 80 on the back board 70. Further, the bracket 80 includes securing sections 83 for securing the bracket on the back board 70. Each of the securing sections 83 is provided with screw holes (not shown), to screw the bracket 80 onto the back board 70.

The driving shaft 101 as the rotational driving shaft of the driving motor 100 secured on a back surface of the bracket 80 pierces through a circular hole formed in a back surface of the bracket 80, and thus a top end of the driving shaft 101 is positioned inside the bracket 80 while the motor body is positioned outside the bracket 80.

The photo conductor shaft 102 as a rotational driven shaft pressure fits into a shaft bearing 73 secured to and piercing through the back board 70. The photo conductor shaft 102 is provided at predetermined position in the axis direction thereof with a securing ring 103 having a diameter larger than that of the photo conductor shaft 102, and this securing ring 103 positions the photo conductor shaft 102 with regard to the apparatus body in the axis direction by being abut to a side surface of the unit side of the shaft bearing 73.

The constant velocity joint 110 connects the driving shaft 101 with the photo conductor shaft 102, which are mutually arranged on the same line in the axis direction in the bracket 80. As stated above, the bracket 80 is formed by means of the bending process of the plate and therefore differences of bending angles tend to occur while it is processed. As such, a precise positioning of the driving motor 100 with regard to the back board 70 becomes hard. Further, the driving shaft 101 of the driving motor 100 tends to skew from the photo conductor shaft 102. Even if a skew of the driving shaft 101 may occur, because the driving shaft 101 and the photo conductor shaft 102 are connected each other through the constant velocity joint 110 in the printer, a transmission of the rotational driving force at the constant velocity from the driving shaft 101 to the photo conductor shaft 102 is possible.

The constant velocity joint 110 includes a female joint unit 120 as a first rotation body and a male joint unit 150 as a second rotation body. Further, the female joint unit 120 is connected to the photo conductor shaft 102 at a left end thereof in an axis direction of the female joint unit in FIG. 4. Still further, the male joint unit 150 is connected to the driving shaft 101 of the driving motor 100 at a right end thereof in an axis direction of the male joint unit in FIG. 4.

Figure 5:
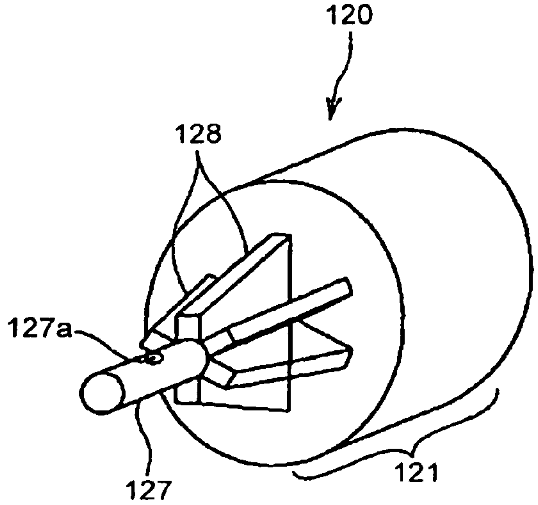
FIG. 5 is a perspective view of a cup unit of a female joint unit of the constant velocity joint.

The female joint unit 120 includes a cylindrical shaped cup unit 121 into which the male joint unit 150 is inserted through an opening provided at one end in an axis direction of the female joint unit 120. A shaft 127 projects from the other end of the cup unit 121 in such a manner that the shaft extends along and on a central axis line of the cup unit 121. The cup unit 121 and shaft 127 are formed of the same resin material into one piece (integral molding). Further, as illustrated in FIG. 5, the cup unit 121 includes ribs 128 that project from the other end opposing to the opening and connect the cup unit 121 with the shaft 127 are formed of the resin material into one piece with the cup unit 121 and the shaft 127. Six ribs 128 are formed such that the ribs are equally spaced each other in a rotational direction around the shaft 127, and have positional relations therebetween having mutual phase differences by 60 degrees in the rotational direction.

Figure 6:
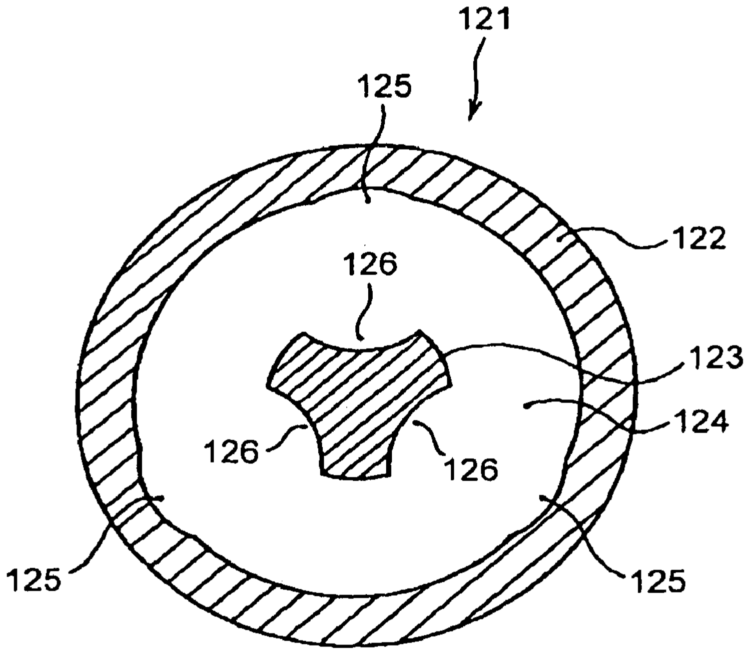
FIG. 6 is a lateral cross section of the cup unit.

The cup unit 121, as illustrated in the lateral cross section in FIG. 6, includes an outer ring 122, an inner ring 123 inside the outer ring, an annular space 124 created between the outer ring 122 and the inner ring 123, three outer grooves 125 provided on an interior surface of the outer ring 122, and three inner grooves 126 provided on an exterior surface of the inner ring 123. Then, as illustrated in FIG. 4, one end of the cup unit in the axis direction of the annular space 124 is opened, while the other end thereof is closed. The male joint unit 150 is inserted into the cup unit through the opening.

As illustrated in FIG. 6, the three outer grooves 125 provided on the interior surface of the outer ring 122, while extending in the axis direction of the outer ring 122, are so formed that the grooves are arranged in the circumferential direction by the mutual phase differences of 120 degrees. The three inner grooves 126 provided on the exterior surface of the inner ring 123, while extending in the axis direction of the inner ring 123, are so formed that the grooves are arranged in the circumferential direction by the mutual phase differences of 120 degrees. The outer grooves 125 and the inner grooves 126 are faced to each other through the annular space 124.

Figure 7:
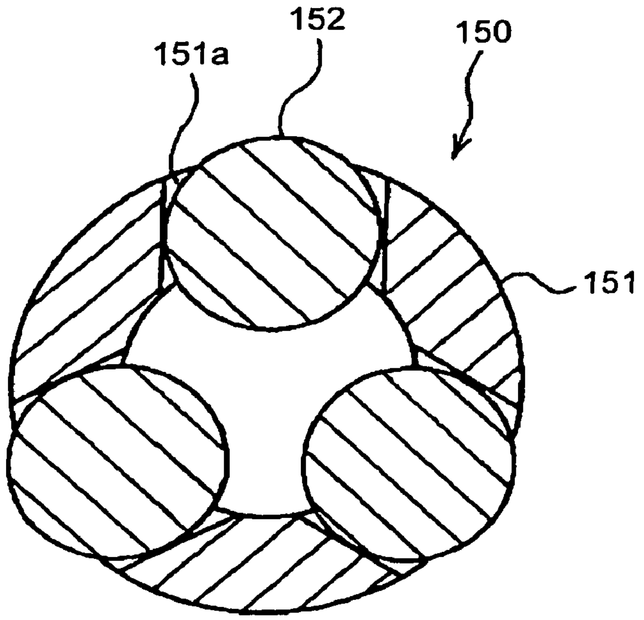
FIG. 7 is a lateral cross section of a ball holder of a male joint unit of the constant velocity joint.

The male joint unit 150 as the second rotation body includes at its top end a cylindrical ball holder 151. The ball holder 151, of which the latent cross sectional view is illustrated in FIG. 7, has three through holes 151*a* provided on a cylindrical peripheral wall so as to be arranged in a peripheral direction by mutual phase differences of 120 degrees, and holds balls 152 as a sphere body within the respective through holes 151*a* in a rotational manner.

Figure 8:
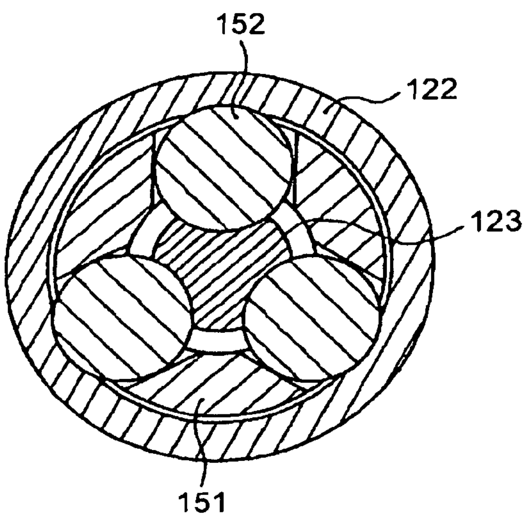
FIG. 8 is a lateral cross section of the cup unit and the ball holder inserted into an annular space of the cup unit.

In FIG. 4 as explained above, the cylindrical ball holder 151 of the male joint unit 150 is inserted into the annular space 124 of the cup unit 121 of the female joint unit 120. Under such a condition, as illustrated in FIG. 8, three balls 152 held by the ball holder 151 of the male joint unit are sandwiched between the outer grooves provided on the interior surface of the outer ring 122 and the inner grooves of the exterior surface of the inner ring 123 of the female joint unit, respectively, to prohibit movement of the ball in a normal direction. However, because the outer grooves and the inner grooves extend in the axis direction, the movement of the balls 152 in the axis direction is allowed.

Figure 9:
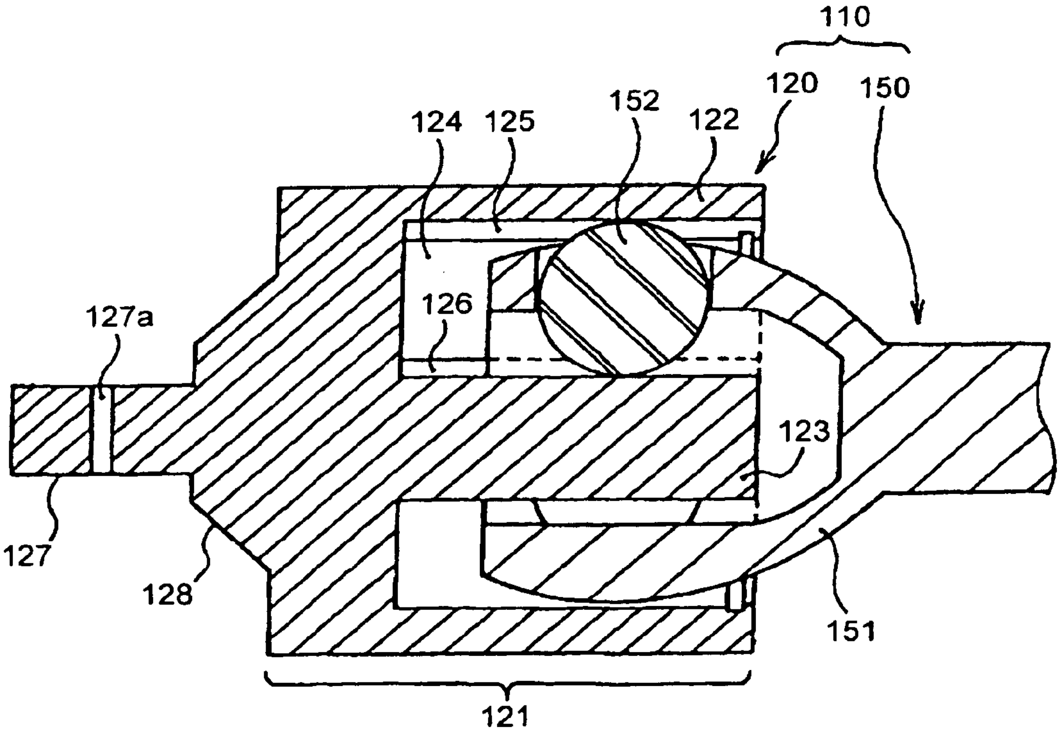
FIG. 9 is a longitudinal cross section of the cup unit and the ball holder inserted into the annular space of the cup unit.

The cylindrical ball holder 151 of the male joint unit is inserted into the annular space 124 of the cup unit of the female joint unit as illustrated in FIG. 9. The three balls 152 held by the cylindrical ball holder 151 are engaged with the outer grooves and the inner grooves, respectively, within the annular space 124 as illustrated in FIG. 8. Then, when the three balls 152 rotate in association with the driving shaft 101 of the driving motor 100 as illustrated in FIG. 4, the rotational driving force of the driving motor is transmitted to the female joint unit 120 at a constant velocity through the three balls 152. As such, the photo conductor shaft 102 as well as the photo conductor (not shown) rotates at a constant velocity.

In the meantime, such an example has been explained that grooves are provided on both of the interior surface of the outer ring 122 and the exterior surface of the inner ring 123 to receive the balls 152 therebetween; however, the grooves may be provided on either one of the interior surface of the outer ring 122 or the exterior surface of the inner ring 123.

The resin material that forms the cup unit 121, the shaft 127, and the ribs 128, as illustrated in FIG. 9, into one piece is a synthetic resin capable of being used in the injection molding process. The synthetic resin material may be either one of a thermoplastic resin or a thermosetting resin as far as it can be used in the injection molding process. The synthetic resin capable of being used in the injection molding process includes a crystalline resin and a non-crystalline resin. Any of the synthetic resin may be used here. It is, however, preferable to use the crystalline resin, because, a toughness of the non-crystalline resin is low and thus if a torque equal to or larger than the allowable value is imposed thereto, a rapid destruction may occur. It is further preferable to use such a synthetic resin having a relatively high lubricant property. Examples of such synthetic resin include a poly oxy methylene (POM), a nylon, a fluorocarbon resin capable of being used in the injection molding process (for example, PFA, FEP, ETFE), a polyimide capable of being used in the injection molding process, a poly phenylene sulfide (PPS), an all-aromatic polyester, a polyether ether ketone (PEEK), and a polyamide-imide. Those synthetic resins may be used independently, or may be used in a combination of two or more of them as a polymer alloy. Still further, a synthetic resin other than the above that has a relatively low lubricant property may be used if such synthetic resin is made into a polymer alloy with the above exemplified synthetic resin being blended.

Examples of the most preferable synthetic resin for the cup unit 121 include a POM, a nylon, PPS, and PEEK. The nylon is exemplified as a nylon 6, a nylon 66, a nylon 610, a nylon 612, a nylon 11, a nylon 12, a nylon 46, and a half aromatic nylon series having an aromatic series formation in molecular chain. Among those, the POM, the nylon, and the PPS are excellent in a heat resist property and the lubricant property and further relatively inexpensive, such that the constant velocity joint 110 having excellent cost performance can be realized. Further, because the PEEK is excellent in a mechanical strength and the lubricant property even without being blended with an additional agent or the lubricant, the constant velocity joint having a high function can be realized.

In the constant velocity joint 110 having the above stated structure, because the cup unit 121 is formed of the resin material, weight of the female joint unit 120 can be reduced, comparing to the conventional structure in which the cup unit is formed of a metallic material. Further, because the interior surface of the outer ring 122 is made of the resin material, a smooth rotation can be achieved between the female joint unit 120 and the male joint unit 150 without a necessity of grease in the annular space 124 and the operation noise of the cup unit can also be minimized comparing to the conventional structure in which the cup unit is formed of the metallic material. Still further, the ribs 128 that project from the cup unit 121 and connect the cup unit 221 with the shaft 127 are formed into one piece with the cup unit 121 and the shaft 127, resulting in having the ribs 128 function as beams of the cup unit 121. Accordingly, the skew from the axis direction caused by a deformation of the cup unit 121 that is made of resin of low rigidity is suppressed and the constant velocity of the rotational driving force can be maintained. As a result of the above statement, the constant velocity joint 110 of the printer can be made into light weight, minimize the operation noise at a time of torque transmission, and eliminate a necessity of the grease. As such, without an affection of noise and grease contamination, the constant velocity joint according to the embodiment can be utilized for the use of the office machine, the acoustic instrument, the medical equipment, the domestic electric appliance, the food manufacturing machine, or the like.

The ribs 128 are not limited to specific sizes; however, such sizes that the ribs will not project to the outside of the outer ring 122 in the normal direction is preferable. This is because of avoiding a catching of the ribs 128 to an equipment and a wiring around the joint and further avoiding an upsizing of the joint due to the projection of the ribs 128. Further, the number of the ribs 128 is not limited to a specific number; however, it is preferable that a plurality of ribs are provided on the cup unit at predetermined pitches in the circumferential direction to suppress the deformation of the ribs 128 in an assured manner. Further, it is preferable that the ribs are provided more than the number of balls 152 (the same as the number of paired grooves) for the reasons as stated below. Still further, the ribs 128 are not limited to specific thicknesses; however, it is desirable that the thicknesses can be changed in accordance with the number of ribs.

In the meantime, the resin material forming the cup unit 121 and the like may be so modified that a solid lubricant agent and a lubricant oil are added to the resin material to enhance the lubricant property. Examples of the solid lubricant agent include a PTFE, a graphite, and a molybdenum disulfide. Further, the resin material may be blended with a glass fiber, a carbon fiber, and various mineral fibers (whisker) to enhance strength thereof. The resin material, still further, may be used together with the solid lubricant agent or the like. The constant velocity joint 110 that transmits the rotational driving force to the photo conductor for Y has been explained above; however, each of the photo conductors for M, C, and K is also structured such that the same constant velocity joint transmits the rotational driving force.

Bearing steel balls, stainless steel balls, ceramic balls, and balls made of synthetic resin can be utilized as the balls 152. Among those, the stainless steel balls are suitable for the balls, because, the stainless steel balls are free of an anxiety of rusting and are inexpensive.

As stated above, the three outer grooves 125 are formed on the interior surface of the outer ring 122 of the cup unit 121. Further, the three inner grooves 126 are formed on the exterior surface of the inner ring 123. As such, three pairs of grooves are formed in such a manner that the outer grooves 125 and the inner grooves 126 corresponds to each other to be paired. These three pairs of grooves are arranged at positions shifting phases by 120 degrees around the axis line of the cup unit 121.

On the other hand, as described above with reference to FIG. 5, the six ribs 128 projecting from the end of the cup unit 121 are arranged at positions shifting phases by 60 degrees to each other around the shaft 127. Further, among the six ribs 128, three of them are positioned on an extending line of the paired grooves that are explained above (not shown). With such a structure, deformation of a position of the extended groove line around a bottom surface of the cup unit 121 can be suppressed, the position being where the deformation remarkably tend to occur because the position receives a secondary force from the outer ring 122 that receives a stress toward the normal direction due to a contact with the balls 152. Accordingly, the skew of this position from the axis direction due to the deformation of the cup unit 121 can be suppressed effectively. For the reasons as stated above, the desirable number of ribs 128 is equal to or more than the number of the paired grooves. Further, when the strength is not enough if the ribs are of the same number as the paired grooves, a desirable resolution is to make the number of ribs 128 to an integral multiple of the number of the paired grooves. In the printer, the number of ribs 128 is set to six, which is a double of the number of the paired grooves. As such, an insufficient strength of the cup unit 121 caused due to the insufficient number of ribs 128 is avoidable. Also, a low cost performance can be produced comparing to providing nine ribs.

In the printer, the resin material is used not only for the female joint unit 120 but also for the male joint unit 150. A suitable resin material for the male joint unit 150 is the same as the suitable one for the female joint unit 120. More light weight is achieved by forming the male joint unit 150 with the resin material.

Further, in the printer, as illustrated in FIG. 3B, utilizes as the latent image carrier the photo conductor 2Y that rotates around the photo conductor shaft 102 as the rotational driven shaft and the photo conductor shaft 102 is connected thereto through the constant velocity joint 110. As mentioned above, even if the driving shaft 101 of the driving motor 100 is skewed with regard to the photo conductor shaft 102 due to the fluctuation of accuracy in the bending process of the bracket 80, the rotational driving force can be transmitted to the photo conductor 2Y at the constant velocity. In the photo conductor 2Y, the photo conductor shaft 102 fits into the photo conductor through the central hole provided in the axis direction thereof. With such a structure, the photo conductor 2Y and the processing unit 1Y is detachable from the apparatus body under a condition that the photo conductor shaft 102 is secured to the apparatus body. Further, a positioning of the photo conductor 2Y is achieved by fitting the photo conductor shaft 102 into the photo conductor, and a development gap between the developing sleeve and the photo conductor can be defined accurately by positioning the casing of the processing unit 1Y.

In the meantime, it is exemplified that the male joint unit 150 is connected to the driving shaft 101 of the driving motor 100. To the contrary, the female joint unit 120 may be connected to the driving shaft 101.

In FIG. 4 as explained above, the male joint unit 150 includes a shaft 153 that projects from one end in the axis direction of the ball holder 151, and this shaft 153 is hollow. Since the driving shaft 101 of the driving motor 100 is press fit into the hollow space of the shaft 153, the male joint unit 150 as the second rotation body and the driving shaft 101 as the rotational driving shaft are connected to each other in the axis direction. With such a structure, because the driving shaft 101 is press fit into the hollow space that is extending in the axis direction of the shaft 153, the eccentricity between the driving shaft 101 and the ball holder 151 is suppressed by reducing a backlash therebetween, comparing to a case where the driving shaft 101 is inserted into a slightly larger concave portion provided on the ball holder 151 to be secured with pins. Accordingly, a misalignment of colors and center deviation of the image that is caused by the fluctuation of the velocity of the photo conductor due to the eccentricity between the driving shaft and the ball holder can be suppressed.

The photo conductor shaft 102 having the one end and of a hollow structure is connected to the female joint unit 120 by inserting the shaft 127 of the female joint unit 120 into the hollow structure. Further, the one end of the photo conductor shaft 102 is fittingly provided at an exterior thereof with an additional pipe 156. Accordingly, at the one end of the photo conductor shaft 102, the additional pipe 156, the photo conductor shaft 102, and the shaft 127 are overlapped each other. The photo conductor shaft 102 and the shaft 127 are provided with through holes in a direction orthogonal to the axis direction. Further, a portion of a peripheral surface of the hollow additional pipe 156 is provided with through holes orthogonal to the axis direction. Still further, there are screwing holes corresponding to those through holes through the hollow space. After screws 154 are inserted into the through holes of the additional pipe 156, the photo conductor shaft 102 and the shaft 127, while the through holes and the screw holes of the additional pipe, the conductor shaft, and the shaft are positioned on the same line, the screws are screwed into the screwing holes of the additional pipe 156. As such, the female joint unit 120 is secured to the photo conductor shaft 102.

The additional pipe 156 as a cylindrical member, as illustrated in FIG. 4, is sandwiched between the cup unit 121 and the shaft bearing 73 tightly. With such a structure, a falling out of the photo conductor shaft 102 from the shaft bearing 73 can be prevented. In the printer as stated above, because the photo conductor shaft 102 is inserted into the additional pipe 156 having a diameter larger than that of the photo conductor shaft 102 to have the additional pipe 156 be placed between the female joint unit 120 and the shaft bearing 73, the falling out of the photo conductor shaft 102 from the shaft bearing 73 can be prevented.

The above statement exemplified that the constant velocity joint 110 is provided within a drive transmission mechanism that transmits the driving force from the driving motor 100 to the photo conductor; however, the constant velocity joint 110 may be provided in other drive transmission mechanism. For example, the constant velocity joint 110 may be provided within the drive transmission mechanism that transmits the driving force from the driving motor to the developing sleeve as the developing member. For further example, the constant velocity joint 110 may be provided within the drive transmission mechanism that transmits the driving force from the driving motor to the paper conveying belt 12 as the endless surface mover (more specifically, the driving roller 13).

As stated above, in the constant velocity joint 110 of the printer according to the first embodiment, the plurality of ribs 128 are arranged by the predetermined pitches in the rotational direction of the shaft 127, such that the deformation of the cup unit 121 in the rotational direction can be suppressed in a uniform manner. Accordingly, the skew from the axis direction caused due to the deformation of the cup unit 121 can be suppressed more securely.

Further, because the ribs 128 are provided on the extending line of the paired grooves, the deformation of the portion of the bottom surface of the cup unit 121 on the groove extending line where the deformation tends to occur more frequently can be suppressed to thereby effectively suppress the skew from the axis direction of the cup unit 121.

Further, because the ball holder 151 is made of the resin material, the light weight thereof is achieved comparing to those made of the metal material.

Further, because the resin material for forming the cup unit 121, the shaft 127, and the ribs 128 is the material that can be subjected to the injection molding process, the cup unit 121 can be readily formed by the injection molding process.

Further, in the printer according to the first embodiment, because the constant velocity joint 110 is provided in the drive transmission mechanism that transmits the driving force from the driving motor 100 to the photo conductor, even if the skew occurs between the driving shaft 101 and the photo conductor shaft 102, an image degradation due to the fluctuation of the velocity of the photo conductor is avoidable by having the photo conductor rotate at the constant velocity. In the meantime, if the constant velocity joint 110 is provided within the drive transmission mechanism that transmits the driving force from the driving motor to the developing sleeve, a development failure due to the fluctuation of velocity in rotation (banding) of the developing sleeve caused by the skew between the driving shaft and the sleeve shaft is avoidable. Further, if the constant velocity joint 110 is provided within the drive transmission mechanism that transmits the driving force from the driving motor to the paper conveying bolt 12 (driving roller 13), the image deterioration due to a fluctuation of the velocity of the belt caused by the skew between the driving shaft and a shaft of the driving roller is avoidable.

Further, in the printer according to the first embodiment, because the driving motor 100 having the driving shaft 101 as the rotational driving shaft is used as the driving source as well as the photo conductor that rotates around the photo conductor shaft 102 as the rotational driven shaft is used as the latent image carrier, and the driving shaft 101 and the photo conductor shaft 102 are coupled to each other through the constant velocity joint 110, the fluctuation of the velocity of the photo conductor due to the skew between the driving shaft 101 and the photo conductor shaft 102 is avoidable.

Further, because such a photo conductor that the photo conductor shaft 102 pierces through a central hole in the axis direction of the photo conductor is used, the photo conductor 2Y and the processing unit 1Y are detachable from the apparatus body while the photo conductor shaft 102 is secured to the apparatus body. Also, because a positioning of the photo conductor 2Y is determined by fitting photo conductor with the photo conductor shaft 102 as well as the casing of the processing unit 1Y is positioned, the development gap between the developing sleeve and the photo conductor can be decided accurately.

Further, because the male joint unit 150 as the second rotation shaft and the driving shaft 101 are connected in the axis direction by press fitting the driving shaft into the male joint unit, the misalignment of colors and the center deviation of the image that are caused by the fluctuation of the velocity of the photo conductor caused by the eccentricity between the male joint unit 150 and the driving shaft 101 can be suppressed, comparing to the case where the driving shaft 101 is inserted in the slightly larger concave portion provided on the ball holder 151 to be secured through pins. In the meantime, the male joint unit 150 may be press fit into the driving shaft 101. Also, either one of the female joint unit 120 as the first rotation body and the driving shaft 101 may be press fit into the other one in the axis direction.

Still further, in the printer according to the first embodiment, the photo conductor shaft 102 is rotatably supported by the shaft bearing 73 secured to the apparatus body, and the photo conductor shaft 102 is inserted into the additional pipe 156 as the cylindrical member having the diameter larger than that of the photo conductor shaft 102 to have the additional pipe 156 be placed at a position between the female joint unit 120 and the shaft bearing 73. With the above stated structure, the falling out of the photo conductor shaft 102 from the shaft bearing 73 can be avoided while the fitting of the additional pipe 156 strengthens the photo conductor shaft 102.

A second embodiment of the present invention is explained below. In the printer according to the second embodiment, the interior surface of the outer ring composing the cup unit as the first rotation body of the constant velocity joint is formed of the resin material and a layer of the outer side of this interior surface is formed of the metal material.

The printer according to the second embodiment is featured in the structure of the constant velocity joint that differs from the structure of the constant velocity joint according to the first embodiment. The structure other than the constant velocity joint is identical to that of the first embodiment, and therefore the same reference numerals are given to the same components and the explanation thereof is omitted here.

Figure 10A:
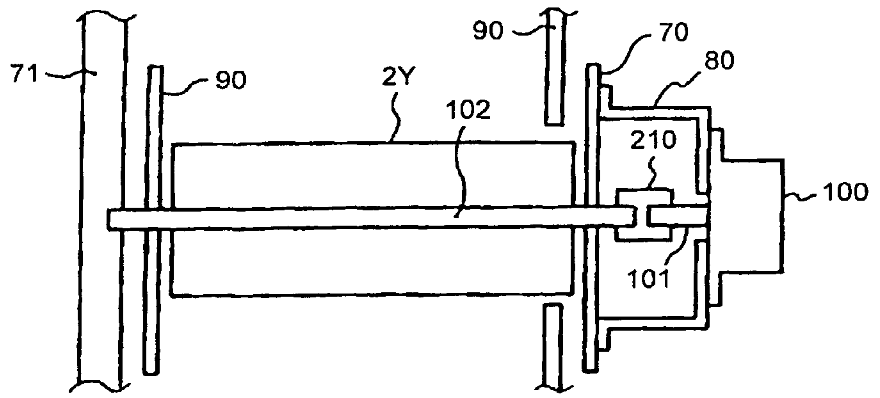
FIG. 10A is a longitudinal cross section of a processing unit for Y and its surrounding structure according to a second embodiment of the present invention.
Figure 10B:
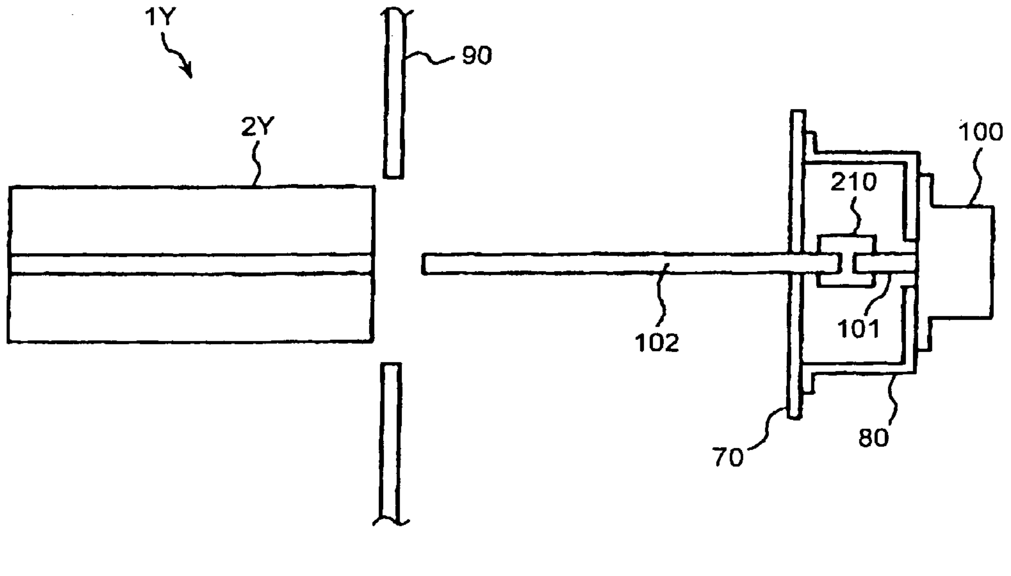
FIG. 10B is a longitudinal cross section of the processing unit for Y in the course of being detached from the printer and its surrounding structure according to the second embodiment.

FIG. 10A is a longitudinal cross sectional view for explaining the processing unit for Y and its peripheral structure in the printer according to the second embodiment, and FIG. 10B is a longitudinal cross sectional view for explaining the processing unit for Y while it is detached from the printer and its peripheral structure. As illustrated in FIG. 10A, the processing unit 1Y is positioned between the front board 71 and the back board 70. The center of the circle of the photo conductor 2Y is provided with the central hole that pierces through from the one end to the other end of the photo conductor in the axis direction as illustrated in FIG. 10B. The back board 70 supports the photo conductor shaft 102 in a rotation free manner by means of the shaft bearing (not shown). When the processing unit 1Y is installed in the printer as illustrated in FIG. 10A, the photo conductor shaft 102 is inserted into the central hole of the photo conductor 2Y. The lateral cross sectional shape of this central hole has a non-circular shape such as the D-letter shape and the oval shape, while the lateral cross sectional shape of the photo conductor shaft 102 has the same shape.

The driving motor 100 as the driving source is secured to a surface of the back board 70 through the bracket 80 at a position opposing to the front board 71 of the printer body. The photo conductor shaft 102 and the driving shaft 101 as the rotational driving shaft of the driving motor 100 are aligned in the axis direction and coupled to each other through a constant velocity joint 210. The photo conductor 2Y is held by a frame body 90 (as illustrated in FIG. 10B) of the processing unit 1Y.

Next, a featured structure of the printer according to the second embodiment will be explained below.

Figure 11:
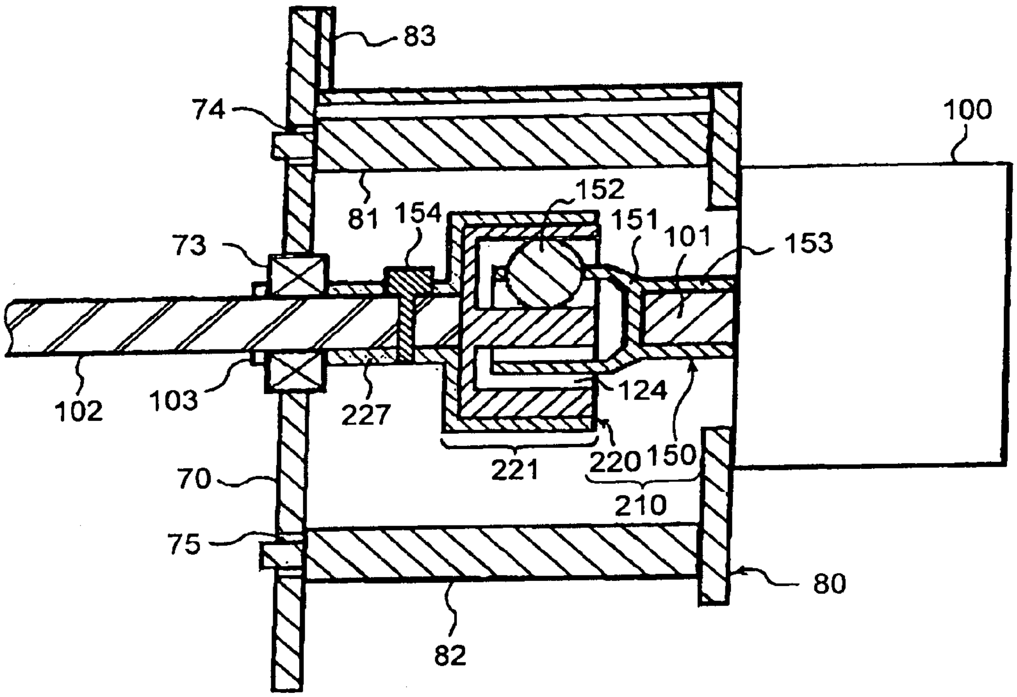
FIG. 11 is a cross section of the constant velocity joint of the printer and its surrounding structure according to the second embodiment.

FIG. 11 is a cross sectional view for explaining the constant velocity joint 210 and its peripheral structure. In FIG. 11, a left side of the back board 70 is a unit side in which the processing unit (not shown), is housed, and a right side of the back board 70 is a drive transmission side in which the driving motor 100 and so on are housed. The bracket 80 is secured to a surface of the drive transmission side of the back board 70, and further the driving motor 100 is secured to a back surface of the bracket 80. Then, the constant velocity joint 210 is housed inside of the bracket 80.

The bracket 80 is formed of the plate through the bending process such as the press work process. The bracket 80 includes two positioning pins 81, 82 for positioning the bracket 80 on the back board 70, the positioning pins being inserted into the two positioning holes 74, 75 in the back board 70. The bracket 80 further includes securing sections 83 at which the bracket is secured to the back board 70 through screws. Screw holes (not shown), are provided in the securing sections 83 of the bracket 80 to secure the bracket on the back board 70 through screws.

The driving motor 100 secured on the back surface of the bracket 80 has the driving shaft 101 as the rotational driving shaft that pierces through a circular hole in the back surface of the bracket 80 to place a top end of the driving shaft 101 in the bracket 80 while the entire motor body is positioned outside the bracket 80.

The photo conductor shaft 102 as the rotational driving shaft pierces through the back board 70 while it is press fit into the shaft bearing 73 secured to the back board 70. The securing ring 103 having the diameter larger than that of the photo conductor shaft 102 is engaged at a predetermined position in the axis direction of the photo conductor shaft 102, and this securing ring 103 contacts a side surface of the unit side of the shaft bearing 73 to thereby position the photo conductor shaft 102 with regard to the apparatus body in the axis direction.

The constant velocity joint 210 couples the driving shaft 101 with the photo conductor shaft 102 that align in the axis direction inside the bracket 80. As stated above, the bracket 80 is formed of the plate by the bending process and thus differences in bending angles tend to occur during the bending process. As such, positioning between the back board 70 and the driving motor 100 with an accuracy is hard. Further, the skew of the driving shaft 101 of the driving motor 100 tends to occur with regard to the photo conductor shaft 102. In the printer, even if the skew of the driving shaft 101 occurs as stated above, because the driving shaft 101 and the photo conductor shaft 102 are coupled to each other through the constant velocity joint 210, the rotational driving force can be transmitted from the driving shaft 101 to the photo conductor shaft 102 at the constant velocity.

The constant velocity joint 210 includes a female joint unit 220 as the first rotation body and the male joint unit 150 as the second rotation body. The photo conductor shaft 102 is connected to a left end of the female joint unit 220 in the axis direction in FIG. 11. The driving shaft 101 of the driving motor 100 is connected to a right end of the male joint unit 150 in the axis direction in FIG. 11.

Figure 12:
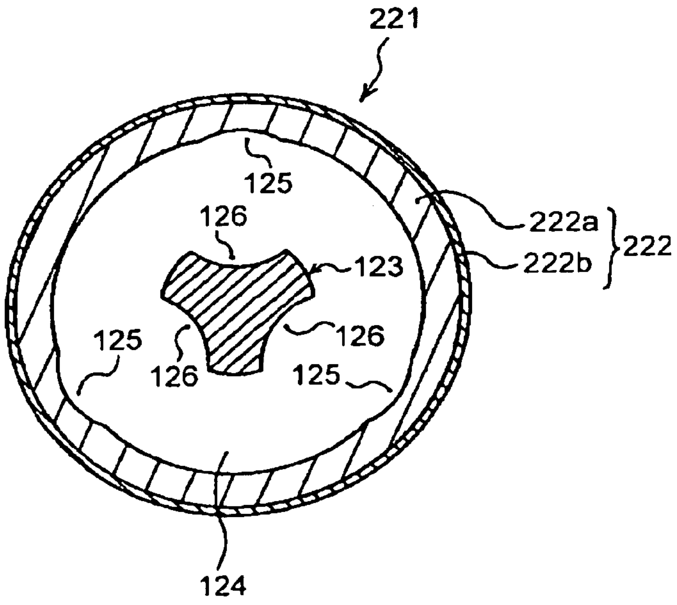
FIG. 12 is a lateral cross section of the cup unit of the female joint unit of the constant velocity joint.

The female joint unit 220 includes the cylindrical cup unit 221 into which the male joint unit 150 is inserted through the opening provided at one end of the axis direction. This cup unit 221, of which lateral cross section is illustrated in FIG. 12, includes an outer ring 222, the inner ring 123 inside the outer ring 222, the annular space 124 created between the outer ring and the inner ring, three outer grooves 125 provided on an interior surface of the outer ring 222, and three inner grooves 126 provided on an exterior surface of the inner ring 123. As illustrated in FIG. 11, one end of the annular space 124 in the axis direction is opened while the other end thereof is closed, and the male joint unit 150 is inserted into the female unit through the opening.

As illustrated in FIG. 12, the three outer grooves 125 provided on the interior surface of the outer ring 222 is formed such that the grooves are aligned in the circumferential direction by mutual phase gaps of 120 degrees while the grooves extend in the axis direction of the outer ring 222. The three inner grooves 126 provided on the exterior surface of the inner ring 123 also are formed such that the grooves are aligned in the circumferential direction with mutual phase gaps by 120 degrees while the grooves extend in the axis direction of the inner ring 123. The outer grooves 125 and the inner grooves 126 corresponds to each other through the annular space 124.

Figure 13:
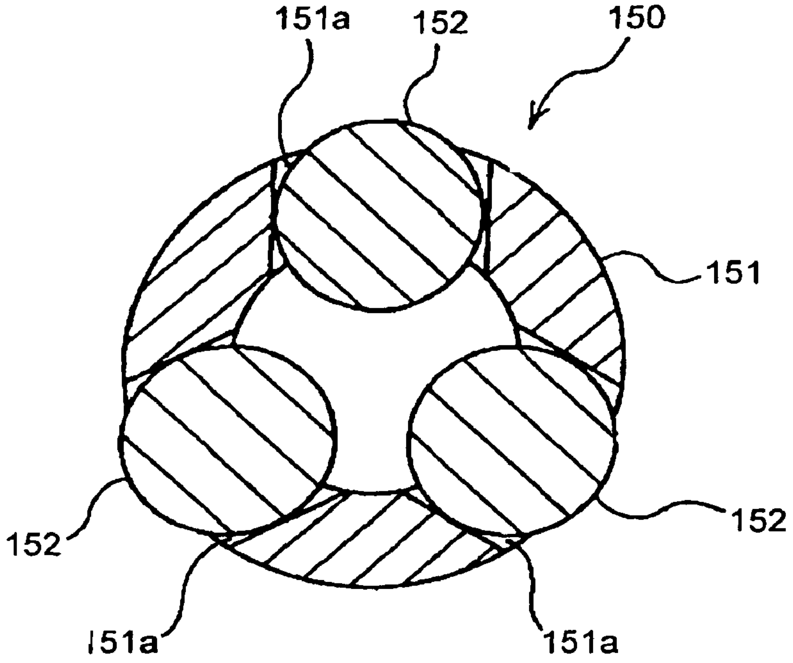
FIG. 13 is a lateral cross section of the ball holder of the male joint unit of the constant velocity joint.

The male joint unit 150 as the second rotation body includes the ball holder of the cylindrical shape at the top end thereof. This ball holder 151, of which lateral cross section is illustrated in FIG. 13, has three through holes 151*a* provided in a cylindrical peripheral wall in such a manner that the through holes are aligned in a peripheral direction with the mutual phase gaps by 120 degrees, and holds the balls 152 as spherical bodies in an rotational manner within the through holes 151*a*.

Figure 14:
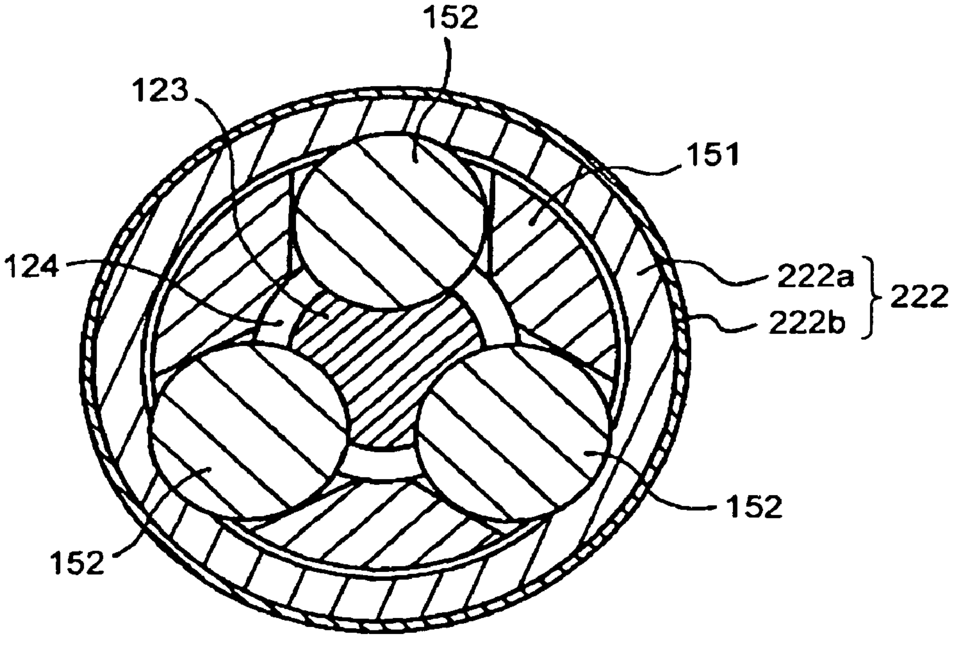
FIG. 14 is a lateral cross section of the cup unit and the ball holder inserted into the annular space of the cup unit.

In FIG. 11 as stated above, the ball holder 151 of the cylindrical shape of the male joint unit 150 is inserted into the annular space 124 of the cup unit 221 of the female joint unit 220. Under this condition, as illustrated in FIG. 14, the three balls 152 held by the ball holder 151 of the male joint unit are sandwiched between the outer grooves provided on the interior surface of the outer ring 222 and the inner grooves provided on the exterior surface of the inner ring 123 of the female joint unit, and therefore the movement of the balls in the normal direction is prevented. However, the outer grooves and the inner grooves extend in the axis direction, respectively, such that the movement of the balls 152 in the axis direction is allowed.

Figure 15:
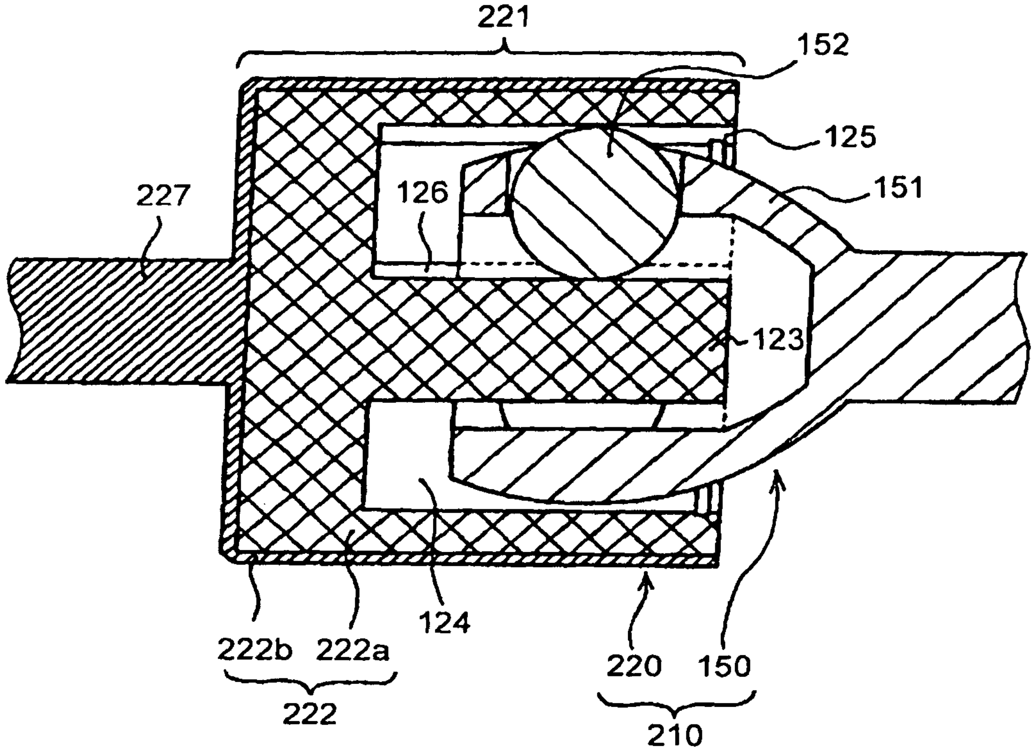
FIG. 15 is a lateral cross section of the cup unit and the ball holder inserted into the annular space of the cup unit.

The ball holder 151 of the cylindrical shape of the male joint unit is inserted into the annular space 124 of the cup unit of the female joint unit as illustrated in FIG. 15, and therefore the three balls 152 held by the ball holder are engaged between the outer grooves and the inner grooves within the annular space 124 as illustrated in FIG. 14. Then, the three balls are rotated in association with the driving shaft 101 of the driving motor 100 as illustrated in FIG. 11 to transmit the rotational driving force to the female joint unit 220 through the three balls 152 at the constant velocity. As such, the photo conductor shaft 102 as well as the photo conductor (not shown) are rotated at the constant velocity.

In the meantime, such an example has been explained that both of the interior surface of the outer ring 222 and the exterior surface of the inner ring 123 are provided with grooves, respectively, to receive the balls 152 therebetween;

however, the grooves may be provided on either one of the interior surface of the outer ring or the exterior surface of the inner ring.

In FIGS. 14 and 15, the outer ring 222 of the cup unit 221 of the female joint unit 220 has a two-layered structure including an innermost layer 222*a* defining the interior surface of the outer ring 222 and a metal layer 222*b* outside the inner layer. The innermost layer 222*a* is formed of the resin material. More specifically, the innermost layer is formed of the synthetic resin capable of being used in the injection molding process, and thus either of a thermoplastic resin or thermosetting resin may be available as far as it can be used in the injection molding process. The synthetic resin available for the injection molding process includes a crystalline resin and a non-crystalline resin. Either one of the synthetic resins may be used here; however, the crystalline resin is preferable because the non-crystalline resin has less toughness and thus the non-crystalline resin may be rapidly destroyed when a torque beyond the allowable value is imposed. Further, the use of the crystalline resin having relatively high lubricant property is desirable. Examples of such synthetic resin include the poly oxy methylene (POM), the nylon, the fluorocarbon resin capable of being used in the injection molding process (for example, PFA, FEP, ETFE), the polyimide capable of being used in the injection molding process, the poly phenilene sulfone (PPS), the all-aromatic polyester, the polyether ether ketone (PEEK), and the polyamide-imide. Those synthetic resins may be used alone or may be used as a polymer alloy in the form of a combination of two or more of them. Further, the resin having relatively low lubricant property other than those synthetic resins can be used as far as the resin is formed into the polymer alloy in which the resin is blended with the synthetic resins.

The synthetic resin most suitable for the innermost layer 222*a* includes the POM, the nylon, the PPS and the PEEK. The suitable nylon is a nylon 6, a nylon 66, a nylon 610, a nylon 612, a nylon 11, a nylon 12, a nylon 46 and a half aromatic nylon series having an aromatic series formation in molecular chain, or the like. Among those, the POM, the nylon, and the PPS are excellent in the heat resistance property and the lubricant property and further relatively inexpensive, such that the constant velocity joint 210 having excellent cost performance can be realized. Further, because the PEEK is excellent in a mechanical strength and the lubricant property even without being blended with an additional agent or the lubricant agent, the constant velocity joint 210 having a high function can be realized.

The metal layer 222*b* of the outer ring 222 is formed of the metal material such as stainless steel, steel, aluminum alloy, and copper alloy, and takes a roll of enhancing a rigidity of the outer ring 222 in the normal direction. In the constant velocity joint 210 having such structure, because the interior surface of the outer ring 222 is formed of the resin material, the weight of the female joint unit 220 can be reduced, comparing to the conventional structure in which the entire outer ring 222 is formed of the metal material. Further, because the interior surface of the outer ring 222 is formed of the resin material, the female joint unit 220 and the male joint unit 150 are rotated smoothly without filling the grease in the annular space 124 and the operation noise thereof can be minimized, comparing to the conventional structure of the male joint unit and the female joint unit formed of the metal material as well. Still further, because the outer ring 222 is formed into the two-layered structure and provided with the metal layer 222*b* formed of the metal material having high rigidity, the metal layer being formed outside the innermost layer 222*a* defining the interior surface of the outer ring 222, flexing of the outer ring 222 in the normal direction due to a friction with the balls 152 can be suppressed as well as the constant velocity of the rotational driving force can be kept. As a result of the above, the constant velocity joint 210 of the printer can be formed into a light weight, reduce the operation noise at the time of transmitting torque, and eliminate the necessity to fill the grease. As a further result of the above, the constant velocity joint is free of the limitation by the noise or the grease contamination, thereby being applicable to the office machine, the acoustic instrument, the medical equipment, the domestic electric appliance, the food manufacturing machine or the like, such application, however, being conventionally difficult.

In the meantime, if the constant velocity joint can be used in such an environment that the grease contamination can be allowed, the solid lubricant agent or the lubricant oil can be added to enhance the lubricant property. Examples of the solid lubricant agent include the PTFE, the graphite, and the molybdenum disulfide. Further, the resin material may be blended with the glass fiber, the carbon fiber, and various mineral fibers (whisker) to enhance strength, and also may be used together with the solid lubricant agent or the like. The constant velocity joint 210 that transmits the rotational driving force to the photo conductor for Y is explained above; however, the photo conductors for M, C, and K also include the constant velocity joint having the same structure as the photo conductor for Y in transmitting the driving force. Further, the example of the female joint unit 220 having the cup unit 221 of the two-layered structure is explained above; however, the cup unit of a three-layered structure can also produce the same advantageous result as the two-layered structure if the innermost layer is formed of the resin material and at least one layer other than the innermost layer is formed of the metal material. However, because the two-layered structure is the simplest one among multi-layered structure, reduction of cost can be realized comparing to the structure including three or more layers.

Bearing steel balls, stainless steel balls, ceramic balls, and balls made of synthetic resin can be utilized as the balls 152. Among those, the stainless steel balls are suitable for the balls because the stainless steel balls are free of an anxiety of rusting and are inexpensive.

The cup unit 221 of the female joint unit 220, as illustrated in FIG. 15, employs such a structure that a cup base body formed integrally with the innermost layer 222*a* and the inner ring 123 using the same resin material is engaged within the cylindrical metal body composing the metal layer 222*b* as the outermost layer. With such a structure, the metal layer 222*b* and the innermost layer 222*a* of the resin material can be formed without such a complex process that the innermost layer 222*a* formed of the resin material is molded by the centrifugal molding process within the cylindrical metal body composing the metal layer 222*b*.

The cup base body, which is so formed that the innermost layer 222*a* and the inner ring 123 are integrally molded, may be secured to the metal layer 222*b* using adhesion or screws, or further may be engaged within the metal layer 222*b* without using the adhesion and the screws. However, if the cup base body is only engaged with the metal layer, it is desirable that irregularity is made on the interior surface of the metal layer 222*b* while the corresponding irregularity is to be made on the exterior surface of the cup base body to prevent idling of the cup base body within the metal layer 222*b*.

The cylindrical metal body composing the metal layer 222*b* has a shaft 227, the shaft 227 being integrally formed of a metal material as the same material as the cylindrical metal body and extending on a central axis of the metal body. The shaft 227 as an independent member may be secured to the cylindrical metal body; however, misalignment of axis may occur in such a case because the fluctuation of positioning accuracy may occur upon securing the shaft to the metal body. An integral formation of the shaft 227 with the cylindrical metal body will contribute to avoid such misalignment of axis and thus to avoid the deterioration of a constant velocity property due to the misalignment of axis.

In the printer, not only the interior surface of the outer ring 222 and the inner ring 123 of the female joint unit 220 but also the male joint unit 150 are formed of the resin material. Suitable resin material for the male joint unit 150 is the one as suitable resin material for the interior surface of the outer ring 222. Since the male joint unit 150 is formed of the resin material, further weight saving can be achieved.

In the printer, as illustrated in FIG. 10B, the photo conductor 2Y that rotates around the photo conductor shaft 102 as the rotational driven shaft is used as the latent image carrier to couple the photo conductor shaft 102 through the constant velocity joint 210. As it has been stated above, even if the driving shaft 101 of the driving motor 100 is skewed to the photo conductor shaft 102 because of the fluctuation of accuracy in bending process of the bracket 80, the rotational driving force can be transmitted at the constant velocity to the photo conductor 2Y. The photo conductor 2Y has the photo conductor shaft 102 that pierce fits the central hole of the photo conductor in the axis direction thereof. In such a structure, the photo conductor 2Y and the processing unit 1Y are detachable from the apparatus body while the photo conductor shaft 102 is secured to the apparatus body. Further, the photo conductor 2Y is positioned by fitting it with the photo conductor shaft 102 as well as the casing of the processing unit 1Y is positioned, such that the development gap between the developing sleeve and the photo conductor can be determined accurately.

In the meantime, such an example that the male joint unit 150 is connected to the driving shaft 101 of the driving motor 100 is explained above; however, to the contrary, the female joint unit 220 may be connected to the driving shaft 101.

In FIG. 11 as explained above, the male joint unit 150 includes the shaft 153 that projects from one end in the axis direction of the ball holder 151 to the axis direction thereof, with the shaft 153 being hollow. Since the driving shaft 101 of the driving motor 100 is press fit into the hollow space of the shaft 153, the male joint unit 150 as the second rotation body and the driving shaft 101 as the rotational driving shaft are connected to each other in the axis direction. With such a structure, because the driving shaft 101 is press fit into the hollow space extending in the axis direction of the shaft 153, a relative backlash between the driving shaft 101 and the ball holder 151 can be reduced to suppress the eccentricity therebetween comparing to the case where the driving shaft 101 is inserted into the relatively large concave portion provided on the ball holder 151 to be secured through pins. As such, the misalignment of colors and the center deviation of the image due to the fluctuation of the velocity of the photo conductor caused by the eccentricity between the driving shaft 101 and the ball holder 151 can be suppressed.

The shaft 227 that is formed integrally with the metal layer 222*b*, which is the outermost layer of the outer ring 222 of the female joint unit 220, also has a hollow structure in which one end of the photo conductor shaft 102 is inserted to connect the photo conductor shaft 102 with the female joint unit 220. Through holes, which pierce through the conductor shaft in the direction orthogonal to the axis direction, are provided near the end portion of the photo conductor shaft 102. Through holes are also provided with a portion of the peripheral wall of the shaft 227 of the female joint unit 220, with the through holes piercing through the peripheral wall in the direction orthogonal to the axis direction. Further, screw holes are provided at a portion corresponding to these through holes through the hollow space. After the photo conductor shaft 102 is inserted into the hollow space of the shaft 227 and the screws 154 are inserted into the through holes of the shaft 227 and the through holes of the photo conductor shaft 102 under the condition that the through holes of the shaft 227 and the through holes of the photo conductor shaft 102 are positioned in a line, the photo conductor shaft 102 is screwed onto the shaft through the screwing holes of the shaft 227. As such, the female joint unit 220 is secured to the photo conductor shaft 102. A length of the hollow space of the shaft 227 in the axis direction is set to such a length that an end surface of the shaft 227 contacts the shaft bearing 73 secured to the back board 70. Accordingly, when the shaft 227 is secured to the photo conductor shaft 102 through the screws 154, the shaft bearing 73 is sandwiched between the securing ring 103 preliminary secured to the photo conductor shaft 102 and an end surface of the female joint unit 220 secured to the photo conductor shaft 102. As a result thereof, the falling out of the photo conductor shaft 102 from the shaft bearing 73 is prevented. As stated above, the printer has a structure that the falling out of the photo conductor shaft 102 from the shaft bearing 73 is prevented by the female joint unit 220 connected to the photo conductor shaft 102.

Such an example that the constant velocity joint 210 is provided within the drive transmission mechanism that transmits the driving force from the driving motor 100 to the photo conductor is explained above; however, the constant velocity joint 210 may be provided within other drive transmission mechanism. For example, the constant velocity joint 210 may be provided within the drive transmission mechanism that transmits the driving force from the driving motor to the developing sleeve as the developing member. For further example, the constant velocity joint 210 may be provided within the drive transmission mechanism that transmits the driving force from the driving motor to the paper conveying belt 12 as the surface endless mover (more specifically, the driving roller 13).

In the constant velocity joint 210 of the printer according to the second embodiment, the outer ring 222 has the two-layered structure including the innermost layer 222*a* formed of the resin material and the metal layer 222*b* that is formed of the metal material and that is the outermost layer, such that cost reduction can be realized comparing to the structure including three or more layers.

Further, the cup unit 221 used herein is so formed that the cap base body that is formed into one piece with the innermost layer 222*a* and the inner ring 123 using the same resin material is engaged into the cylindrical metal body composing the metal layer 222*b* as the outermost layer. With such a structure, the metal layer 222*b* and the innermost layer 222*a* formed of the resin material can be formed without a complex process in which the innermost layer 222*a* formed of the resin material is centrifugal molded within the cylindrical metal body composing the metal layer 222*b*.

Further, the cylindrical metal body, used herein, composing the metal layer 222*b* is so formed that the shaft 227 that extends on a central axis of the cylindrical metal body is formed integrally with the cylindrical metal body using the same metal material. With such a structure, the misalignment of the shaft center that may occur when the shaft formed independently from the cylindrical metal body is secured to the cylindrical metal body is avoidable and thus the deterioration of the constant velocity property due to the misalignment of the shaft center is avoidable.

Further, because the ball holder 151 is formed of the resin material, weight saving is achieved comparing to the ball holder formed of the metal material.

Further, because the resin material that forms the innermost layer 222*a* can be used in the injection molding process, the cup base body can be readily made by the injection molding process and the metal layer 222*b* and the innermost layer 222*a* formed of the resin material can be formed.

Further, in the printer according to the second embodiment, because the constant velocity joint 210 is provided within the drive transmission mechanism that transmits the driving force from the driving motor 100 to the photo conductor, even if the skew occurs between the driving shaft 101 and the photo conductor shaft 102, the photo conductor can be rotated at the constant velocity, resulting in preventing the deterioration of the image caused by the fluctuation of the velocity of the photo conductor. In the meantime, if the constant velocity joint 210 is provided within the drive transmission mechanism that transmits the driving force from the driving motor to the developing sleeve, deficiency in development due to the fluctuation of rotational velocity (banding) of the developing sleeve caused by the skew between the driving shaft and the sleeve shaft is avoidable. Further, if the constant velocity joint 210 is provided within the drive transmission mechanism that transmits the driving force from the driving motor to the paper conveying belt 12 (driving roller 13), the image deterioration due to the fluctuation of the velocity of the belt caused by the skew between the driving shaft and the driving roller shaft is avoidable.

Further, in the printer according to the second embodiment, because the driving motor 100 having the driving shaft 101 as the rotational driving shaft is used as the driving source as well as the photo conductor that rotates around the photo conductor shaft 102 as the rotational driven shaft is used as the latent image carrier and further because the driving shaft 101 and the photo conductor shaft 102 are coupled through the constant velocity joint 210, the fluctuation of the velocity of the photo conductor caused by the skew between the driving shaft 101 and the photo conductor shaft 102 is avoidable.

Further, because the photo conductor having such a structure that the photo conductor shaft 102 pierce fits through the central hole created in the axis direction of the photo conductor is used, the photo conductor 2Y and the processing unit 1Y are detachable from the apparatus body while the photo conductor shaft 102 is secured to the apparatus body. Also, the photo conductor 2Y is positioned by fitting it with the photo conductor shaft 102 and the casing of the processing unit 1Y is also positioned, resulting in accurate determination of the development gap between the developing sleeve and the photo conductor.

Further, because the male joint unit 150 as the second rotation body and the driving shaft 101 are connected in the axis direction by press fitting the driving shaft into the male joint unit, misalignment of colors and the center deviation of the image by a fluctuation of the velocity of the photo conductor caused by the eccentricity between the male joint unit 150 and the driving shaft 101 can be suppressed comparing to the case where the driving shaft 101 is inserted into the slightly larger concave portion provided on the ball holder 151 to be secured by pins. In the meantime, the male joint unit 150 may be press fit into the driving shaft 101. Also, one of the female joint unit 220 as the first rotation body or the driving shaft 101 may be press fit into the other one in the axis direction.

Further, the printer according to the second embodiment has such a structure that the photo conductor shaft 102 is rotatably supported by the shaft bearing 73 secured to the apparatus body and the falling out of the photo conductor shaft 102 from the shaft bearing 73 is prevented by the female joint unit 220 connected to the photo conductor shaft 102, such that the reduction of cost is achieved by omitting a dedicated member for the sake of preventing the falling out of the photo conductor shaft.

Further advantageous result and modifications are readily conceivable by a person skilled in the art. The embodiments of the invention are not limited to the specific ones as stated above. Therefore, various modifications are available without departing from the spirit of the invention defined in the accompanying claims and the equivalences thereof.

In these embodiments, because the cup unit as the first rotation body is formed of the resin material, the weight of the first rotation body can be reduced comparing to the conventional structure in which the cup unit was formed of the metal material. Further, it becomes apparent from the production prototype of the inventors, in which the cup unit is formed of the resin material, that the operation noise can be minimized by such cup unit formed of the resin material while the first rotation body and the second rotation body are rotated smoothly without the necessity of filling the grease in the annular space, comparing to the conventional cup unit formed of the metal material. Still further, the ribs, that project from the cup unit and serve to couple the cup unit with the shaft, are formed integral with the cup unit and the shaft, thereby having the ribs function as the beams of the cup unit. Accordingly, the skew from the axis direction due to the deformation of the resin made cup unit having low rigidity can be suppressed and thus the constant velocity property of the rotational driving force can be kept.

Further, in these embodiments, because the interior surface of the outer ring of the first rotation body is formed of the resin material, weight of the first rotation body can be reduced comparing to the conventional structure in which the entire outer ring has been formed of the metal material. Still further, because the interior surface of the outer ring is formed of the resin material, as it becomes apparent from the production prototype of the inventors, the operation noise can be minimized while the first rotation body and the second rotation body are rotated smoothly even without filling the grease in the annular space, comparing to the conventional structure in which the entire outer ring was formed of the metal material. Still further, because the outer ring is made into the multi-layered structure and the layer outside the innermost layer which defines the interior surface of the outer ring is formed of the metal material having the rigidity higher than the resin material, the flexing of the outer ring in the normal direction according to the friction with the balls can be suppressed and thus the constant velocity property of the rotational driving force can be kept.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A constant velocity joint, comprising:

a first rotation body including a cup-shaped cup unit including a closed end, one open end, an outer ring between the open and closed ends, an inner ring inside the outer ring, and an annular space, the annular space extending between the outer ring and the inner ring, a plurality of grooves on at least one of an inner surface of the outer ring and an outer surface of the inner ring, the grooves aligned in a circumferential direction and extending in an axis direction of the annular space, a shaft projecting from the closed end of the cup unit and extending on a central axis line of the cup unit, and at least one rib projecting from the closed end of the cup unit to connect the cup unit with the shaft; and a second rotation body including a ball holder to hold a ball in each of a plurality of through holes, the through holes being on a cylindrical peripheral wall and aligned in a peripheral direction thereof, wherein one of the first rotation body and the second rotation body is configured to transmit a rotational driving force to other one of the first rotation body and the second rotation body through the balls while the ball holder is inserted into the annular space and the balls held by the ball holder are engaged in the grooves within the annular space, the cup unit, the at least one rib, and the shaft are one piece and include a resin material, and a plurality of ribs are aligned in a rotational direction of the shaft at associated pitches.

2. The constant velocity joint according to claim 1, wherein the rib is on an extended line of the grooves.

3. The constant velocity joint according to claim 1, wherein a material of the ball holder is a resin material.

4. The constant velocity joint according to claim 1, wherein the resin material of the cup unit, the shaft, and the rib is an injection molding process resin material.

5. An image forming apparatus, comprising:

a latent image carrier to carry a latent image on a surface that is endless and movable;

a latent image forming unit to form the latent image on the surface;

a developing member to develop the latent image into a visible image on the latent image carrier by using a developing agent;

a transfer unit to transfer the visible image to any one of a surface of a surface endless mover and a recording member held by the surface endless mover;

a drive transmission mechanism to transmit a driving force from a driving source to at least one of the latent carrier, the developing member, and the surface endless mover; and a constant velocity joint within the drive transmission mechanism, the constant velocity joint including a first rotation body including a cup-shaped cup unit including a closed end, one open end, an outer ring between the open and closed ends, an inner ring inside the outer ring, and an annular space, the annular space extending between the outer ring and the inner ring, a plurality of grooves on at least one of an inner surface of the outer ring and an outer surface of the inner ring, the grooves aligned in a circumferential direction and extending in an axis direction of the annular space, a shaft projecting from the closed end of the cup unit and extending on a central axis line of the cup unit, and at least one rib projecting from the closed end of the cup unit to connect the cup unit with the shaft; and a second rotation body including a ball holder to hold a ball in each of a plurality of through holes, the through holes being on a cylindrical peripheral wall and aligned in a peripheral direction thereof, wherein one of the first rotation body and the second rotation body is configured to transmit a rotational driving force to other one of the first rotation body and the second rotation body through the balls while the ball holder is inserted into the annular space and the balls held by the ball holder are engaged in the grooves within the annular space, the cup unit, the at least one rib, and the shaft are one piece and include a resin material, and the constant velocity joint includes a plurality of ribs that are aligned in a rotational direction of the shaft at associated pitches.

6. The image forming apparatus according to claim 5, wherein the rib is on an extending line of a corresponding one of the grooves.

7. The image forming apparatus according to claim 5, wherein a material of the ball holder is a resin material.

8. The image forming apparatus according to claim 5, wherein a material of the cup unit, the shaft, and the at least one rib is a resin material, the resin material being an injection molding process resin material.

9. The image forming apparatus according to claim 5, wherein a driving motor with a rotational driving shaft is configured as a driving source, a photo conductor configured to rotate around a rotationally driven shaft is configured as a latent image carrier, and the rotational driving shaft and the rotationally driven shaft are coupled to each other through the constant velocity joint.

10. The image forming apparatus according to claim 9, wherein a structure of the photo conductor is a structure that includes a central hole provided in an axis direction of the photo conductor, the rotationally driven shaft configured to press fit into the central hole.

11. The image forming apparatus according to claim 9, wherein any one of the first rotation body or the second rotation body, and the rotational driving shaft of the driving motor are press fit into the other one in the axis direction to connect therebetween in the axis direction.

12. The image forming apparatus according to claim 10, wherein the rotationally driven shaft is rotatably supported by a shaft bearing secured to an apparatus body, and the rotationally driven shaft is configured to be insertable into a cylindrical member of a diameter larger than a diameter of the rotationally driven shaft to place the cylindrical member at a position between the shaft bearing and one of the first rotation body and the second rotation body.

* * * * *